United States Patent
Kwidzinski et al.

(10) Patent No.: US 9,026,712 B2
(45) Date of Patent: May 5, 2015

(54) USB DEVICE CONTROL USING ENDPOINT TYPE DETECTION DURING ENUMERATION

(75) Inventors: Piotr Kwidzinski, Folsom, CA (US); Zhenyu Zhu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 13/532,730

(22) Filed: Jun. 25, 2012

(65) Prior Publication Data

US 2013/0346660 A1 Dec. 26, 2013

(51) Int. Cl.
*G06F 21/85* (2013.01)

(52) U.S. Cl.
CPC ........................... *G06F 21/85* (2013.01)

(58) Field of Classification Search
CPC .......... G06F 21/82; G06F 21/83; G06F 21/85
USPC .................... 710/200, 313, 10, 104
See application file for complete search history.

(56) References Cited

U.S. PATENT DOCUMENTS

| | | | |
|---|---|---|---|
| 8,572,420 B2 * | 10/2013 | Dutton et al. .................. | 713/323 |
| 2008/0083037 A1 * | 4/2008 | Kruse et al. ..................... | 726/27 |
| 2008/0250165 A1 * | 10/2008 | Reynolds et al. .............. | 710/17 |
| 2010/0180054 A1 * | 7/2010 | Coletrane et al. .............. | 710/51 |
| 2010/0262726 A1 * | 10/2010 | Tauscher et al. ................ | 710/16 |
| 2011/0030030 A1 * | 2/2011 | Terpening et al. ................ | 726/1 |
| 2011/0264828 A1 * | 10/2011 | Zeung et al. ..................... | 710/16 |
| 2012/0240234 A1 * | 9/2012 | Lomont et al. .................. | 726/24 |
| 2013/0055044 A1 * | 2/2013 | Eljezovic et al. ............. | 714/758 |

OTHER PUBLICATIONS

"USB Endpoint Security" table; Windows IT Pro; Nov. 2009; pp. 58-59.*
Endpoint Protector Basic User Manual Version 3.7; CoSoSys Ltd.; 2004-2011.*
GFI EndPointSecurity Brochure; GFI Software; 2012.*
GFI EndPointSecurity Getting Started Guide; GFI Software Ltd.; 1999-2013.*
Heidelberg, Jakob H.; "Product Review: GFI EndPointSecurity"; WindowSecurity.com; Mar. 8, 2007.*

* cited by examiner

*Primary Examiner* — Glenn A Auve
(74) *Attorney, Agent, or Firm* — Schwabe, Williamson & Wyatt, P.C.

(57) ABSTRACT

Described herein are embodiments of USB device control using endpoint type detection during enumeration. An apparatus configured for USB device control using endpoint type detection during enumeration may include a host controller configured to selectively disable enumeration of a USB device based at least in part on an endpoint type of the USB device. The apparatus may include a management engine configured to store in the host controller a USB lock policy defining endpoint types disallowed to be enumerated by the apparatus. Other embodiments may be described and/or claimed.

25 Claims, 5 Drawing Sheets

USB DEVICE CONTROL USING ENDPOINT TYPE DETECTION DURING ENUMERATION

TECHNICAL FIELD

Embodiments of the present disclosure relate generally to the field of universal serial bus (USB) device control using endpoint type detection during enumeration.

BACKGROUND

Peripheral devices are commonly configured to connect with a host computer by a USB connector. In fact, USB ports can be found on many common computing devices. USB devices, however, have been known to present a threat to computer security. For example, USB mass storage devices can be used to spread damaging software (e.g., viruses, malware, key loggers, etc.). USB mass storage devices can also be used for copying data (e.g., intellectual property, confidential information, proprietary information, etc.) from the host computer, which may be a particular concern for corporate computers and networks.

To limit exposure to damaging software and data theft, some computing devices may be configured to disable its USB subsystem or physically lock USB ports altogether, but this type of solution prevents all USB access, including friendly access. Though some software-based solutions have been enlisted, these solutions may only be as secure as the underlying security of the host operating system and may be easily bypassed.

BRIEF DESCRIPTION OF THE DRAWINGS

Embodiments of the present disclosure will be described by way of example embodiments, but not limitations, illustrated in the accompanying drawings in which like references denote similar elements, and in which.

Figure 1:
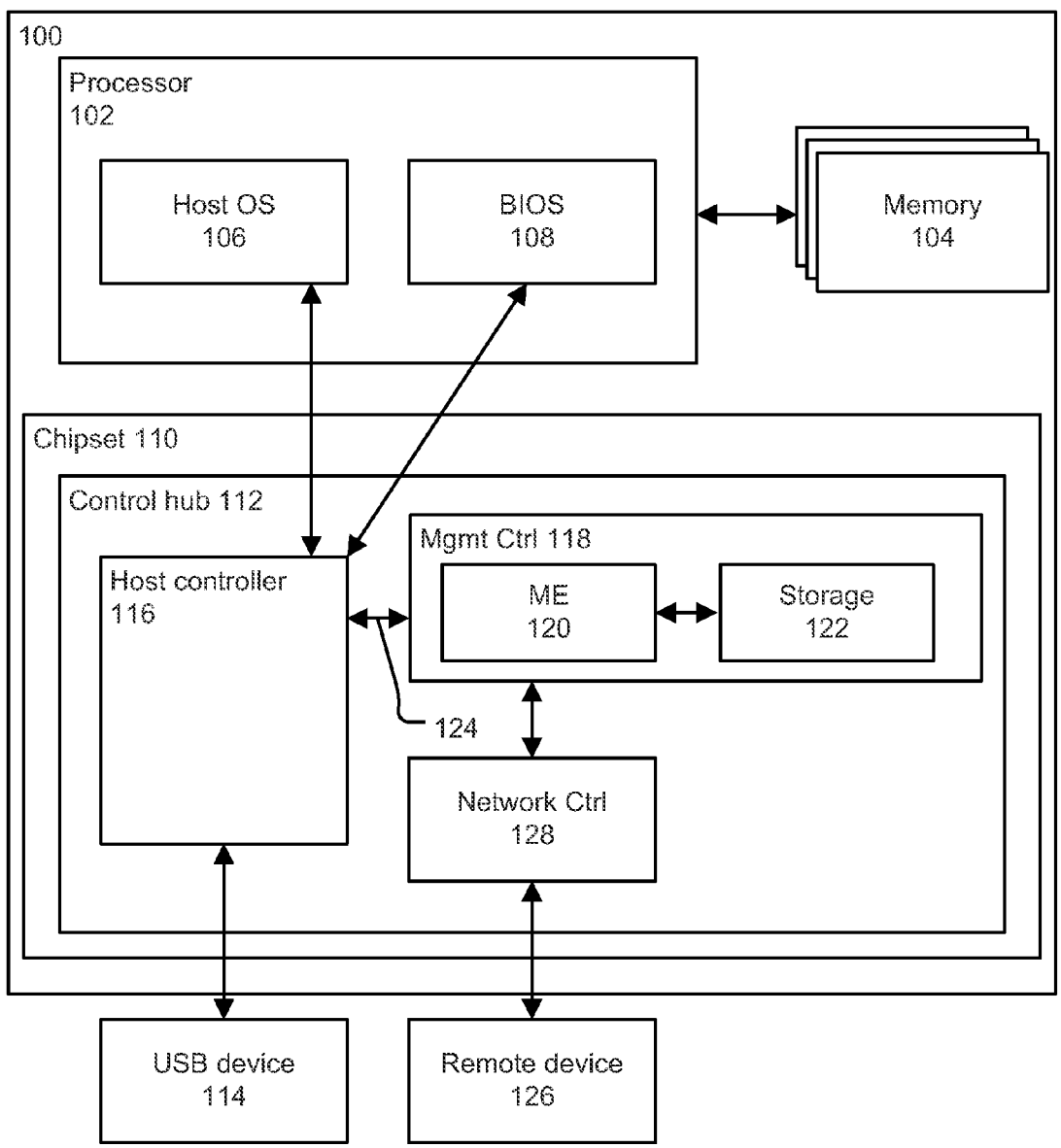
FIG. 1 illustrates an example computing system including a control hub for USB device control using endpoint type detection during enumeration.

all in accordance with embodiments of the present disclosure.

DETAILED DESCRIPTION

Described herein are embodiments of an apparatus configured for USB device control using endpoint type detection during enumeration, a system including the apparatus configured for USB device control using endpoint type detection during enumeration, a method for USB device control using endpoint type detection during enumeration, and computer-readable media having instructions that, if executed by one or more processors, cause an apparatus to perform a method for USB device control using endpoint type detection during enumeration.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various aspects of the illustrative implementations are described herein using terms commonly employed by those skilled in the art to convey the substance of their work to others skilled in the art. It will be apparent to those skilled in the art, however, that embodiments of the present invention may be practiced with only some of the described aspects. For purposes of explanation, specific numbers, materials and configurations are set forth in order to provide a thorough understanding of the illustrative implementations. It will be apparent to one skilled in the art, however, that embodiments of the present invention may be practiced without the specific details. In other instances, well-known features are omitted or simplified in order not to obscure the illustrative implementations.

Further, various operations are described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

For the purposes of the present disclosure, the phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

The description may use the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various entities may be introduced and described with respect to the operations they perform. It will be understood that these entities may include hardware, software, and/or firmware elements that are cooperatively configured to provide the described operations.

FIG. 1 illustrates an example computing system 100 in accordance with various embodiments. The system 100 may include one or more processors 102. In different embodiments, the one or more processors 102 may include one core or multiple cores. In some embodiments, the system 100 may be a multiprocessor system where each of the processors has one or multiple cores.

As shown in FIG. 1, the one or more processors 102 may include a host operating system 106 and a basic input/output system (BIOS) 108, and may be operatively coupled to system memory 104. The system memory 104 may be capable of storing information that the one or more processors 102 utilize to operate and execute programs and operating systems. In different embodiments, the system memory 104 may be any usable type of readable and writeable memory such as a form of dynamic random access memory.

The one or more processors 102 may be operatively coupled to a chipset 110. Though not explicitly shown here, the chipset 110 may include, for example, one or more of memory, integrated peripherals, graphics controllers, interfaces to external peripherals, etc. In various embodiments, the chipset 110 may be embodied as a platform control hub (PCH). Although FIG. 1 illustrates the system memory 104 as being separate from the chipset 110, other implementations may include the system memory 104 as being included in the chipset 110.

The chipset 110 may include a control hub 112 having a host controller 116 configured for selectively disabling enumeration of a USB device 114 based at least in part on an endpoint type of the USB device 114. In various embodiments, the control hub 112 may be an input/output (I/O) controller configured to control one or more I/O devices of the system 100. The host controller 116 may be a hardware component, such as, for example, an xHCI controller, configured for providing I/O support of USB devices. Other host controllers may be suitable in various embodiments.

Embodiments of the present disclosure may be configured to take into consideration that USB device classes generally use specific endpoint types (e.g., control, bulk in and out, isochronous in and out, interrupt in and out). Selectively disabling enumeration based on the endpoint type may allow for filtering out of unwanted device classes while still allowing others to be enumerated and used. For example, USB devices like keyboards, mice, etc., of the human interface device (HID) class generally use the interrupt endpoint type to communicate, while USB devices of the mass storage device class generally use the bulk in or bulk out endpoint type. In some situations, the mass storage device class may be viewed as more of a potential threat than the HID class in that the mass storage device is more likely to be capable of either injecting the apparatus 100 with potentially damaging software (e.g., viruses, malware, key loggers, etc.) or copying data (e.g., intellectual property, confidential information, proprietary information, etc.) from the apparatus 100.

The one or more endpoint types disallowed to be enumerated may be included in a USB lock policy stored in the host controller 116. The USB lock policy may define specific disallowed endpoint types. In various embodiments, the USB lock policy may be disabled for one or more USB ports of the apparatus 100. For example, in some embodiments, integrated peripheral devices may be configured to interconnect with ports of the chipset 110 or other components of the apparatus 100 via USB and it may be desirable to disable the USB lock policy for these types of ports while enabling the USB lock policy for one or more external USB slots.

The host controller 116 may be configured to selectively allow enumeration of the USB device 114 based at least in part on a product identification (PID) of the USB device 114. In various ones of these embodiments, specific USB devices may be excluded from the USB policy. In these embodiments, the specific USB devices may be "whitelisted" such that when the host controller 116 identifies the USB device, enumeration of the USB device continues normally (i.e., without excluding the USB device even if the USB device includes a prohibited endpoint type). Identification of the USB device 114 may be made using the product identification (PID) of the USB device 114, or a combination of the vendor identification (VID) and PID of the USB device 114.

A management controller 118 may be integrated into the control hub 112 for managing the USB lock policy. The integrated management controller 118 may include a management engine 120 and persistent storage 122 for storing the USB lock policy. In various embodiments, the management engine 118 comprises firmware configured to program the USB lock policy into the host controller 116, via a sideband channel 124, for enforcement. In various embodiments, the management engine 118 may be configured to program the USB lock policy into the host controller 116 after reset or reboot of the apparatus 100.

The management controller 118 may be configured to be managed remotely by a remote management device 126. In various embodiments, the management engine 120 of the management controller 118 may be configured to communicate with the remote device 126 independently of the processor 102 or software of the apparatus 100 via out-of-band communication channel. For facilitating out-of-band communication, the control hub 112 may include a network controller 128 for communicating with the remote device 126 over a wired or wireless network, such as, for example, a local access network (LAN) or a remote area network. In various embodiments, the network controller 128 may include an integrated media access control (MAC) controller. In many embodiments, the communication channel between the apparatus 100 and the remote device 126 may be a secure communication channel enlisting encryption of data and user authentication.

The remote device 126 may comprise a remote console including software allowing remote management of the apparatus 100, including management of the USB lock policy. In various embodiments, the remote device 126 and apparatus 100 may be configured for system management using Intel® Active Management Technology. In various ones of these embodiments, the remote device 126 may be able to access the integrated management controller 120 in various states of the apparatus 100, such as when the apparatus 100 is on or when the apparatus 100 is in a sleep mode. In various embodiments, the remote device 126 may also be configured to authenticate a user of the apparatus 100, such as, for example, in situations in which the apparatus 100 is part of an organizational network of computers. In these latter embodiments, any suitable authentication protocol may be used, including, for example, the Kerberos authentication protocol.

For managing the USB lock policy, the remote device 126 may request access to the services of the management engine 120 and then provide an update request of the USB lock policy for one or more of the USB ports of the apparatus 100. The management engine 120 may override any USB lock policies stored internally (in storage 122, for example) and then program the USB lock policy into the host controller 116.

Figure 2:
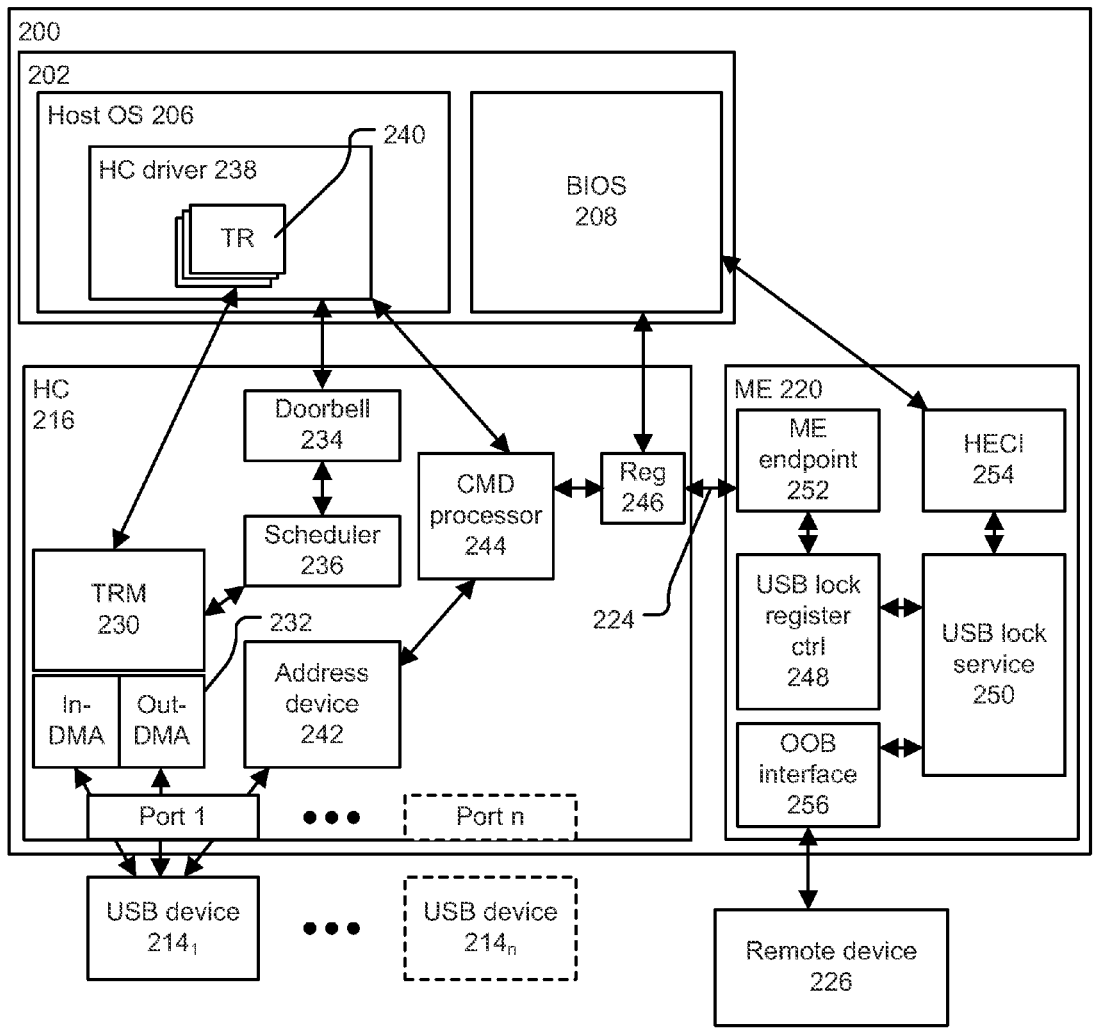
FIG. 2 illustrates another example computing system including a control hub for USB device control using endpoint type detection during enumeration.

FIG. 2 illustrates a detailed representation of an embodiment of a computing system 200 configured for USB device control using endpoint type detection during enumeration. An embodiment of the firmware partition of a management engine 220 configured for managing the USB lock policy may include a host embedded controller interface 254 for interfacing with the BIOS 208, an out-of-band interface 256 for interfacing with a remote management device 226, a USB lock register control 248, a USB lock service 250 for receiving access requests from the remote device 226, and a management engine endpoint 252 for connecting the management engine 220 with the host controller 216 via a sideband connection 224, over which the USB lock policy may be provided to the register set 246 of the host controller 216.

As shown, one or more USB devices $214_1 \ldots 214_n$ may be connected with the host controller 216 via port 1 . . . port n. The host controller 216 may include one or more integrated firmware or hardware components for facilitating USB control, including, for example, a transfer manager 230, direct memory access (DMA) in and out 232, a doorbell 232 for initiating transactions with the processor 202, and a scheduler 236 for arbitrating transactions between multiple USB devices $214_1 \ldots 214_n$, connected to the computing system 200. The host processor 202 may include BIOS 208, host OS 206, and a host controller driver 238 including a transfer engine 240.

The host controller 216 may be configured to detect the USB device $214_1$ on initial plug-in of the USB device $214_1$, and then issue an interrupt to the host software (OS 206 or BIOS 208) and begin enumeration of the USB device $214_1$. The processor 202 may be configured to issue a command to the command processor 244 of the host controller 216 to initialize the set-up of the default control endpoint (endpoint0) of the USB device $214_1$ and the assignment of the unique address for the USB device $214_1$. The address device 242 of the host controller 216 may be configured to read the device descriptor of the USB device $214_1$ prior to completing the address set-up, and store the device descriptor in association with port 1. At this point, the USB device $214_1$ may be accessible through the control endpoint (endpoint0) for device configuration, with the other endpoints being inaccessible.

The processor 202 may be configured to then issue a command to the command processor 244 of the host controller 216 to establish a data pipe over the control. The address device 242 of the host controller 216 may be configured to determine, prior to completion of the command, whether there is a USB lock policy enabled for port 1. The address device 242 may be configured to determine, if there is a USB lock policy enabled for port 1, whether the USB device $214_1$ is whitelisted (i.e., permitted to continue enumeration normally without regard to whether the USB device $214_1$ includes a prohibited endpoint type). The host controller 216 may be configured to allow enumeration to continue of the USB device $214_1$ if the USB device $214_1$ is determined to be whitelisted. The determination may be made with reference to the device descriptor of the USB device $214_1$. In various embodiments, the USB lock policy (including the whitelist of USB devices) may be stored in a register set 246 of the host controller 216.

If the address device 242 determines that the USB device $214_1$ is not whitelisted, the host controller 216 may determine the endpoint types of the USB device $214_1$ by referring to the device descriptor and determine whether the endpoint types are enabled under the USB lock policy. If one or more endpoint types of the USB device $214_1$ are disallowed under the USB lock policy, the host controller 216 may disable enumeration of the USB device $214_1$. In various embodiments, the host controller 216 may return an error message to the processor 202. In various embodiments, a message indicating error may be output by the processor 202 to a display for informing a user of the computing system 200.

If, on the other hand, the address device 242 determines none of the endpoint types of the USB device $214_1$ are disallowed under the USB lock policy, the host controller 216 may complete enumeration of the USB device $214_1$.

Figure 3:
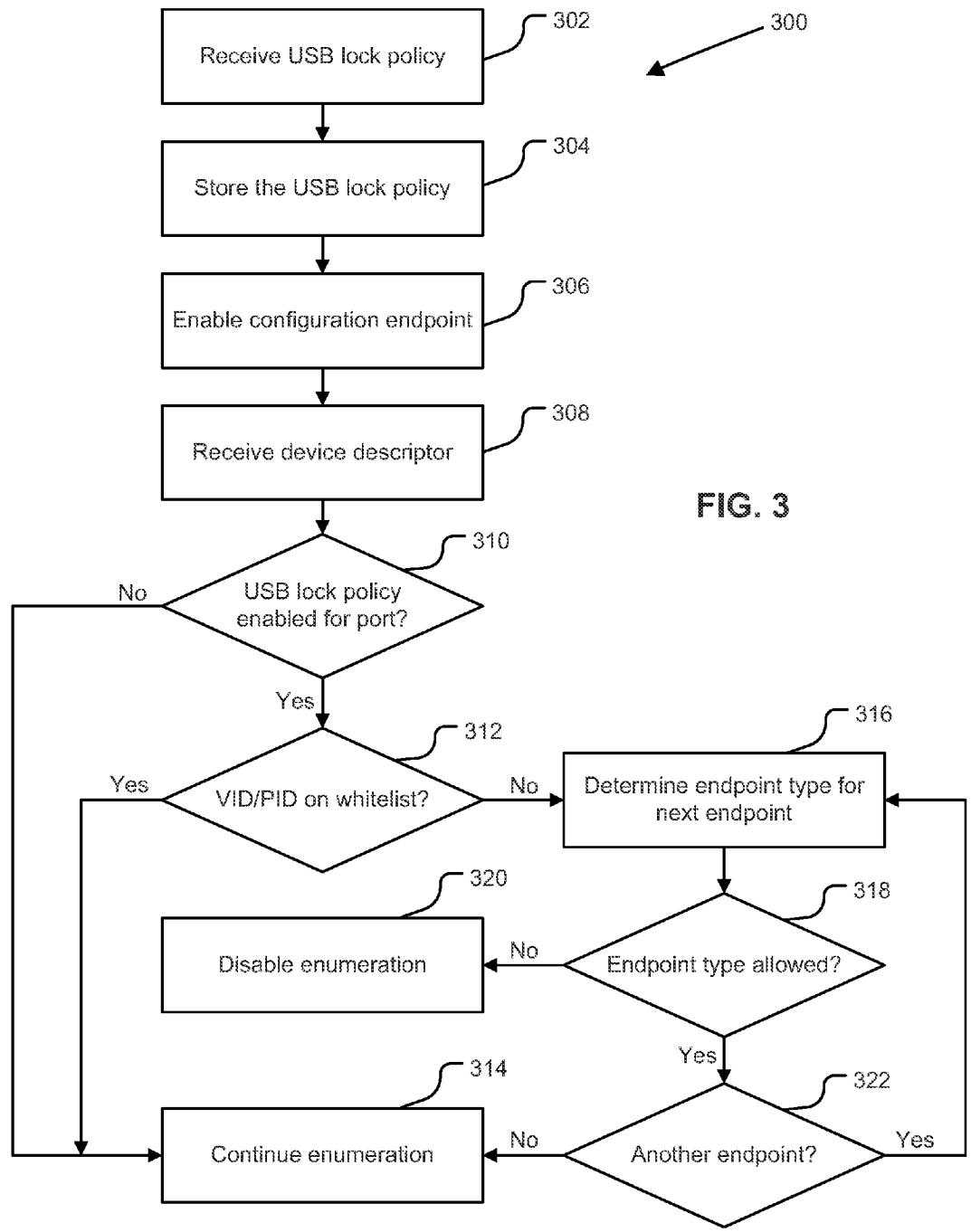
FIG. 3 is a flow chart depicting a method for USB device control using endpoint type detection during enumeration.

FIG. 3 is a flow chart depicting a USB device enumeration method 300, which may be performed by a computing system (such as, for example, computing system 100 or 200) in accordance with the embodiments described herein. The method 300 may include one or more functions, operations, or actions as is illustrated by block 302, 304, 306, 308, 310, 312, 314, 316, 318, 320, and/or 322.

Processing for the method 300 may start with block 302 by receiving by a management engine of an apparatus a USB lock policy defining endpoint type(s) disallowed to be enumerated by the computing system. The USB lock policy may then be stored in a host controller of the computing system at block 304. In various embodiments, the storing of the USB lock policy may be performed during a boot or reset operation of the computing system.

The method 300 may proceed to block 306 by enabling a control endpoint (endpoint0) of a USB device detected by the host controller, and then to block 308 by receiving a device descriptor from the USB device. The device descriptor may include information regarding the endpoint type(s) and one or both of the PID, and the VID of the USB device. Other conventional information including among the device descriptors may include the class of the USB device, the USB type (e.g., USB 1.0, USB 2.0, etc.), etc.

In various embodiments, the operations of blocks 302 and 304 may not be performed on every detection of a USB device. For instance, if the USB lock policy is already stored in the host controller and there are no updates to the USB lock policy, the operations of block 302 and block 304 may be omitted.

The method 300 may proceed to block 310 by determining whether the USB lock policy is enabled for the port connected to the USB device. If the USB lock policy is not enabled for the port, the method 300 may proceed by allowing the enumeration to continue at block 314.

If, on the other hand, the USB lock policy is enabled for the port, the method 300 may proceed to block 312 by determining whether the PID or VID/PID combination is on the whitelist of the USB lock policy. If the PID or VID/PID is on the whitelist, the method 300 may proceed to block 314.

If, on the other hand, the PID or VID/PID is not on the whitelist, the method 300 may proceed to block 316 by determining the next endpoint type for the USB device, and then to block 318 by determining whether the endpoint type is permitted to be enumerated by the computing system. If the endpoint type is not allowed, the method 300 may proceed to bock 320 by selectively disabling the enumeration of the USB device. In various embodiments, an error message may be provided to a processor of the computing system.

If, on the other hand, the endpoint type is allowed, the method 300 may proceed to block 322 by determining whether there is another endpoint for the USB device. If there is another endpoint, the method 300 may proceed back to block 316. Otherwise, the method 300 may proceed to block 314 to continue enumeration of the USB device.

Figure 4:
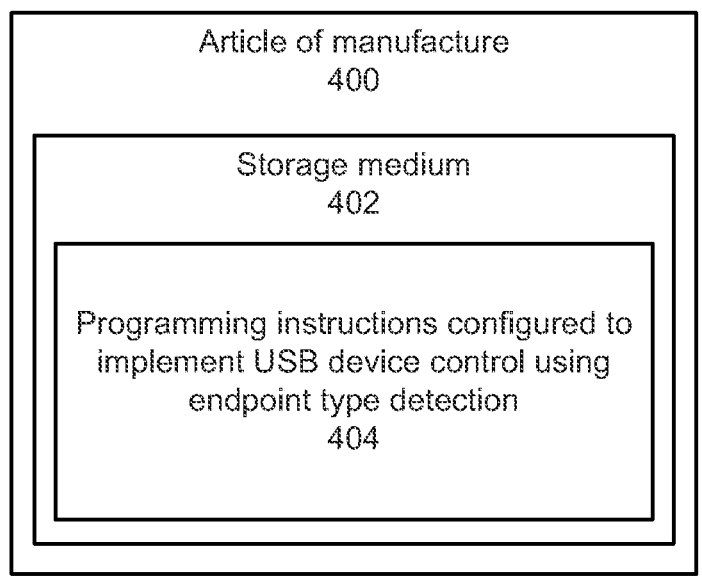
FIG. 4 illustrates an article of manufacture having programming instructions configured to cause an apparatus to practice some or all aspects of USB device control using endpoint type detection during enumeration (of the method of FIG. 3, for example)

In various embodiments, an article of manufacture may be employed to implement one or more methods as disclosed herein. FIG. 4 describes an example article of manufacture 400. As shown, the article of manufacture 400 may include a computer-readable non-transitory storage medium 402 and a storage medium 402. The programming instructions 404 may enable an apparatus, in response to their execution by the apparatus, to perform various operations described herein. For example, the non-transitory storage medium 402 may include programming instructions 404 configured to cause an apparatus or system to practice some or all aspects of USB device control using endpoint type detection during enumeration of the method of FIG. 3, for example, in accordance with embodiments of the present disclosure.

The non-transitory storage medium 402 may represent a broad range of persistent storage medium known in the art, including but not limited to flash memory, dynamic random access memory, static random access memory, an optical disk, a magnetic disk, etc.

Figure 5:
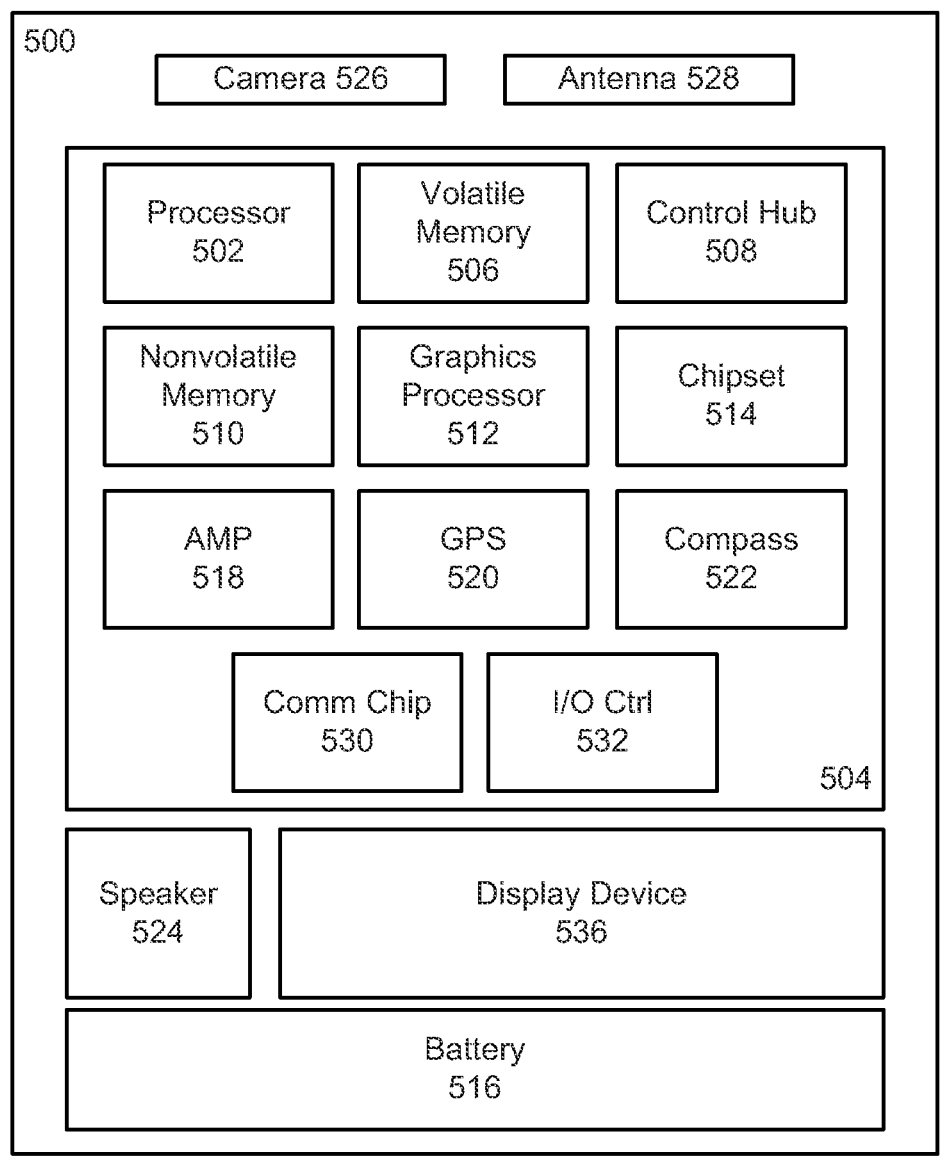
FIG. 5 is a block diagram of a system incorporating a control hub configured for USB device control using endpoint type detection during enumeration.

An embodiment of a system 500 incorporating a control hub 508 configured for USB device control using endpoint type detection during enumeration is illustrated in FIG. 5. In various embodiments, the system 500 may include more or fewer components, and/or different architectures than that shown in FIG. 5.

In various implementations, the system 500 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 500 may be any other electronic device that processes data.

Although not shown here, the control hub 508 may include, for example, one or more components similar to those illustrated for the apparatus 100 of FIG. 1. For example, the control hub 508 may include a host controller configured to selectively disable enumeration of a USB device based at least in part on an endpoint type of the USB device. The control hub 508 may also include a management engine configured to store a USB lock policy in the host controller and to interface with a remote management device for management of the USB lock policy.

In various embodiments, the processor 502 may be physically and electrically coupled with the motherboard 504. Depending on its applications, the system 500 may include other components that may or may not be physically and electrically coupled to the motherboard 504. These other components include, but are not limited to, volatile memory 506 (e.g., dynamic random access memory (DRAM)), non-volatile memory 510 (e.g., read only memory (ROM)), flash memory, a graphics processor 512, a digital signal processor, a crypto processor, a chipset 514, a battery 516, an audio codec, a video codec, a power amplifier 518, a global positioning system (GPS) device 520, a compass 522, an accelerometer, a gyroscope, a speaker 524, a camera 526, an antenna 528, and a mass storage device (such as hard disk drive, compact disk (CD), digital versatile disk (DVD), and so forth).

The system 500 may include at least one communications chip 530 operatively to facilitate communication of the system 500 over one or more networks and/or with any other suitable device. The system 500 may also include at least one I/O controller 532, and in some implementations, the at least one I/O controller 532 may be part of the at least one communication chip 530. In some implementations the at least one communication chip 530 may be part of the processor 502.

The communication chip 530 may enable wireless communications for the transfer of data to and from the system 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 520 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 2G, 3G, 4G, 5G, and beyond. In some implementations, a first communication chip 530 may be dedicated to shorter range wireless communications such as Wi-Fi and Bluetooth and a second communication chip 530 may be dedicated to longer range wireless communications such as GPS, EDGE, GPRS, CDMA, WiMAX, LTE, Ev-DO, and others.

The system 500 may include a display device 536, such as, for example, a cathode ray tube (CRT), liquid crystal display (LCD), light emitting diode (LED), or other suitable display device. The display device 536 may be a touch screen display supporting touch screen features, and in various one of these embodiments, the I/O controller 532 may include a touch-screen controller. In various embodiments, the display device 536 may be a peripheral device interconnected with the system 500.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
a host controller configured to selectively disable enumeration of a universal serial bus (USB) device based at least in part on an endpoint type of the USB device.

2. The apparatus of claim 1, wherein the endpoint type is included in a USB lock policy stored in the host controller and defining endpoint types disallowed to be enumerated by the apparatus.

3. The apparatus of claim 1, further comprising a management engine configured to store in the host controller a USB lock policy defining endpoint types disallowed to be enumerated by the apparatus.

4. The apparatus of claim 3, wherein the management engine is configured to interface with a remote management device for management of the USB lock policy.

5. The apparatus of claim 4, wherein the management engine is configured to interface with the remote management device over an out-of-band communication channel.

6. The apparatus of claim 3, further comprising an I/O controller, wherein the I/O controller includes the host controller and the management engine.

7. The apparatus of claim 3, further comprising a chipset, wherein the chipset includes the host controller and the management engine.

8. The apparatus of claim 7, wherein the chipset comprises a platform control hub.

9. The apparatus of claim 1, wherein the host controller is configured to, after selective disablement of the enumeration of the USB device based at least in part on the endpoint type of the USB device, selectively allow enumeration of the USB device based at least in part on a product identification (ID) of the USB device.

10. The apparatus of claim 9, wherein the product ID is included in a USB lock policy stored in the host controller and defining product identifications allowed to be enumerated by the apparatus.

11. A system comprising:
one or more processors;
a host controller operatively coupled to the one or more processors and configured to selectively disable enumeration of a universal serial bus (USB) device based at least in part on an endpoint type of the USB device; and
a display device operatively coupled to the one or more processors and the host controller.

12. The system of claim 11, further comprising a network interface operatively coupled with the one or more processors, and configured to communicatively couple the system with a network.

13. The system of claim 11, wherein the system is a selected one of a laptop, a netbook, a notebook, an ultrabook, a smartphone, a tablet, a personal digital assistant, an ultra mobile PC, a mobile phone, a desktop computer, a server, a printer, a scanner, a monitor, a set-top box, an entertainment control unit, a digital camera, a portable music player, or a digital video reorder.

14. The system of claim 11, wherein the display device is a touch screen.

15. The system of claim 11, wherein the one or more processors are separate from the host controller.

16. A method comprising:
    during enumeration of a universal serial bus (USB) device, determining an endpoint type of the USB device by a host controller; and
    selectively disabling the enumeration by the host controller based at least in part on the endpoint type.

17. The method of claim 16, further comprising storing in the host controller, by a management engine, a USB lock policy defining endpoint types disallowed to be enumerated.

18. The method of claim 17, further comprising receiving, by the management engine, the USB lock policy from a remote management device.

19. The method of claim 17, wherein the storing is performed during a boot operation.

20. The method of claim 16, further comprising, during the enumeration of the USB device, determining a port identification (ID) of a port coupled with the USB device, and selectively allowing the enumeration by the host controller based at least in part on the port identification.

21. The method of claim 16, further comprising, during the enumeration of the USB device, determining a product identification (ID) of the USB device, and selectively allowing the enumeration of the USB device by the host controller based at least in part on the product ID.

22. A non-transitory machine-readable medium having associated instructions that, when executed by a apparatus, cause the apparatus to perform a method comprising:
    during enumeration of a universal serial bus (USB) device, determining an endpoint type of the USB device by a host controller; and
    selectively disabling the enumeration by the host controller based at least in part on the endpoint type.

23. The non-transitory machine-readable medium of claim 22, wherein the operations further include storing in the host controller, by a management engine, a USB lock policy defining endpoint types disallowed to be enumerated.

24. The non-transitory machine-readable medium of claim 22, wherein the operations further include, during the enumeration of the USB device, determining a port identification (ID) of a port coupled with the USB device, and selectively allowing the enumeration by the host controller based at least in part on the port identification.

25. The non-transitory machine-readable medium of claim 22, wherein the operations further include, during the enumeration of the USB device, determining a product identification (ID) of the USB device, and selectively allowing the enumeration of the USB device by the host controller based at least in part on the product ID.

* * * * *